(No Model.)

J. STEPHENSON.
Axle Lubricator.

No. 241,746. Patented May 17, 1881.

Witnesses:

Joseph Stephenson, Inventor.
By Paine, Grafton & Ladd,
Attorneys.

UNITED STATES PATENT OFFICE.

JOSEPH STEPHENSON, OF OSCEOLA MILLS, PENNSYLVANIA, ASSIGNOR OF ONE-HALF TO JUSTIN J. PIE, OF SAME PLACE.

AXLE-LUBRICATOR.

SPECIFICATION forming part of Letters Patent No. 241,746, dated May 17, 1881.

Application filed February 10, 1881. (No model.)

*To all whom it may concern:*

Be it known that I, JOSEPH STEPHENSON, a citizen of the United States, residing at Osceola Mills, in the county of Clearfield and State of Pennsylvania, have invented certain new and useful Improvements in Lubricating Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of car-wheels, loose pulleys, and wheels in general wherein an oil-chamber or lubricant-receiver is formed in the hub of the wheel, and is combined with devices for conducting the oil to the axle or bearing-surface.

The object of the invention is to provide means for introducing the oil into the receiver or chamber in an expeditious and simple manner, and to effectually prevent its escape therefrom when the wheel is revolving, except through the proper opening leading to the axle or bearing. These objects I attain by the construction and combination of parts hereinafter described and claimed.

Figure 1:
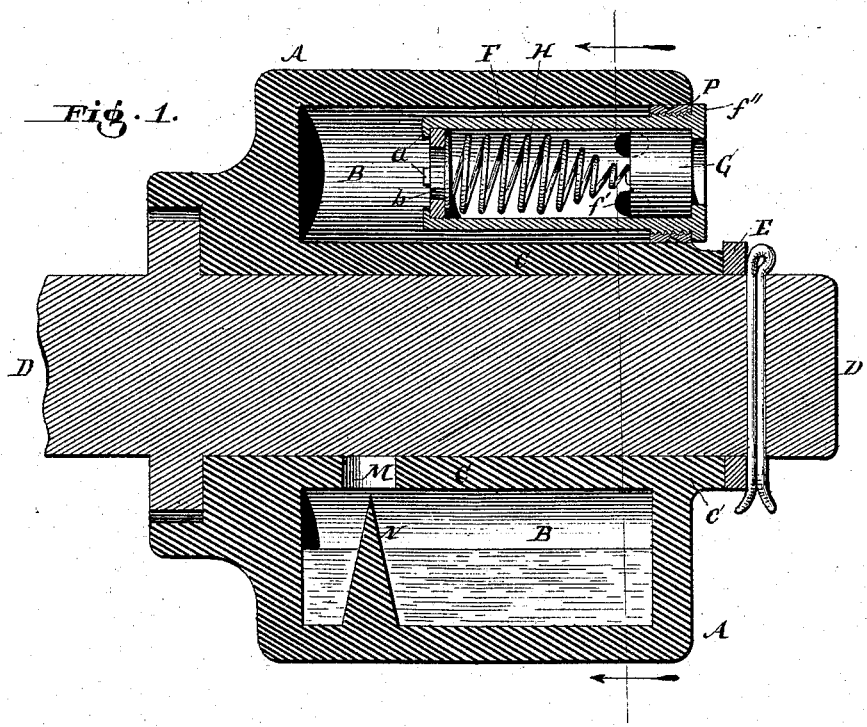
Figure 2:
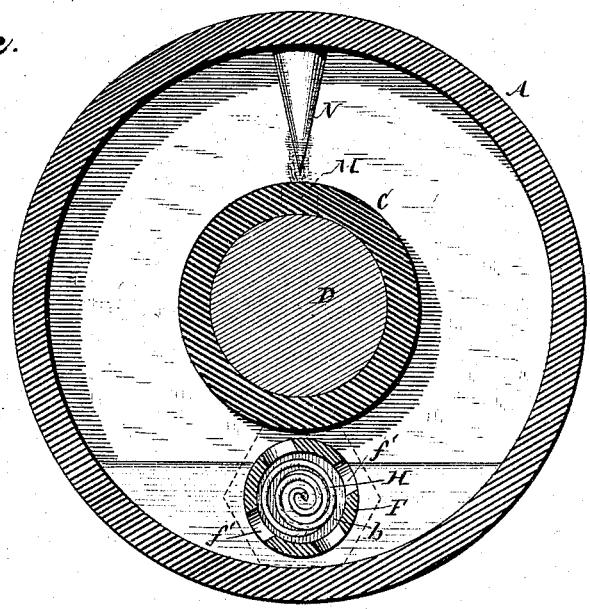

In the drawings, Figure 1 is a longitudinal sectional view of a car-wheel hub embodying my improvements. Fig. 2 is a cross-section taken through the hub and oil-chamber thereof.

The letter A designates the hub of a car-wheel, which is constructed with an annular oil-chamber, B, completely surrounding the central box portion, C, of the hub. The axle D is provided with the customary rear collar and front washer, E, for receiving the hub between the same, holding it in position, and preventing the escape of oil at the ends of the bearing-surface.

I have in the present instance adapted my invention to the hub of a car-wheel revolving on its axle; but it must be obvious that vehicle-wheels in general and loose pulleys can be provided with my lubricating devices.

An opening made in the front wall of the oil-chamber receives a cylinder or tube, F, which projects into the oil-chamber of the hub and contains a spring-pressed plunger or stopper, G. This cylinder F is constructed of soft metal, and has a series of circumferential openings, $f'$, made therein near its front end. These openings communicate between the interior of the tube F and the oil-chamber of the hub, and serve to convey the oil from the former into the latter. The cylinder or tube F is firmly held in the opening in the front of the hub, and may rest upon a suitable packing-gasket, so as to insure a liquid-tight joint; or it may screw into a threaded bushing, P, cast into the opening of the hub. The cylinder is provided with the hexagonal flange $f''$, in order that a wrench can be used to screw it into its place. The rear end of the cylinder or tube is provided with an inwardly-projecting flange or lugs, $a$, which forms a seat or rest for an ordinary washer or ring, $b$, filling the entire bore of the cylinder. A spiral spring, H, held in position by said washer, bears against or is attached to the plunger or stopper G, and presses the same out to a point in front of or immediately over the openings $f'$ in the cylinder F. Thus it will be apparent that when the spring is in its normal position the stopper G closes all communication between the feeding end of the cylinder F and the oil-chamber of the hub.

The oil or lubricant is introduced into the oil-chamber through the feed-tube F and the openings made therein, by forcing the plunger or stopper G back beyond said openings. This operation is generally effected by means of an oil-can having a spout with a closed end and a lateral discharge-opening. The closed end of the can-spout, when introduced into the feed-tube F, pushes back the stopper G, so as to uncover the openings in said tube and permit the oil issuing from the lateral opening of the can-spout to pass into the oil-chamber of the hub. When the can-spout is removed the spiral spring will return the stopper to its normal position. The oil is delivered to the axle bearing-surface through an opening, M, made in the central or box portion of the wheel. A spike or projection, N, applied to the periphery of the outer wall of the oil-chamber and located immediately over or in line with the opening in the box, serves to drip the oil into said opening in regular or measured quantities.

It will be obvious that the oil adheres to this drip spike or projection when it is at its lowest point, and delivers it to the bearing-surface when it is brought uppermost by the revolution of the wheel.

Having thus described my invention, what I claim as new, and desire to secure by Letters Patent, is—

1. The attachable feed tube or cylinder provided with discharge-openings, and a spring-pressed plunger of the same diameter as the bore of said cylinder, in combination with the loose wheel or pulley having an annular oil-chamber inclosing said feed tube or cylinder, and a suitable opening leading to the axle or bearing, substantially as and for the purpose set forth.

2. The combination of the attachable cylinder or tube having rear and front flanges and provided with circumferential openings, and the stopper and spiral spring fitted in said cylinder, with the wheel or pulley hub having an annular oil-chamber and apertured front wall, as and for the purpose set forth.

In testimony whereof I affix my signature in presence of two witnesses.

JOSEPH STEPHENSON.

Witnesses:
 JOSEPH BORDER,
 WM. ASKY.